United States Patent
Puducheri Sundaravaradhan et al.

(10) Patent No.: US 12,494,958 B2
(45) Date of Patent: Dec. 9, 2025

(54) SYSTEMS FOR AND METHODS FOR OVERLAPPING DOWNLINK TRANSMISSIONS

(71) Applicant: Avago Technologies International Sales Pte. Limited, Singapore (SG)

(72) Inventors: Srinath Puducheri Sundaravaradhan, Sunnyvale, CA (US); Ron Porat, San Diego, CA (US); Karim Nassiri Toussi, San Mateo, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 70 days.

(21) Appl. No.: 18/494,824

(22) Filed: Oct. 26, 2023

(65) Prior Publication Data
US 2024/0372769 A1   Nov. 7, 2024

Related U.S. Application Data

(60) Provisional application No. 63/499,856, filed on May 3, 2023.

(51) Int. Cl.
H04L 27/26 (2006.01)
H04L 5/00 (2006.01)
H04W 74/0816 (2024.01)

(52) U.S. Cl.
CPC ........ H04L 27/2666 (2013.01); H04L 5/0007 (2013.01); H04W 74/0816 (2013.01)

(58) Field of Classification Search
CPC .... H04B 7/0452; H04B 17/318; H04B 7/028; H04B 7/024; H04B 7/0617; H04B 7/0413; H04B 7/0619; H04B 7/0697; H04B 17/336; H04L 5/0053; H04L 27/2602; H04L 5/0094; H04L 27/2603; H04L 5/0048; H04L 5/0007; H04L 5/0044; H04L 27/26; H04W 84/12; H04W 72/0453; H04W 72/23; H04W 74/0808; H04W 72/0446; H04W 28/06; H04W 74/08; H04W 72/20
See application file for complete search history.

(56) References Cited

U.S. PATENT DOCUMENTS

| | | | |
|---|---|---|---|
| 9,883,490 B1* | 1/2018 | Hedayat | H04L 5/0007 |
| 9,912,462 B2* | 3/2018 | Azizi | H04L 27/2613 |
| 10,117,130 B2 | 10/2018 | Tsai et al. | |
| 11,848,694 B2* | 12/2023 | Nilsson | H04B 7/0617 |
| 2011/0170627 A1 | 7/2011 | Kwon et al. | |
| 2015/0078257 A1 | 3/2015 | Wu et al. | |
| 2016/0119022 A1 | 4/2016 | Gorokhov et al. | |
| 2016/0165607 A1* | 6/2016 | Hedayat | H04W 24/00 370/338 |
| 2017/0373816 A1* | 12/2017 | Son | H04L 5/003 |
| 2024/0372769 A1* | 11/2024 | Puducheri Sundaravaradhan | H04J 11/005 |

OTHER PUBLICATIONS

Extended European Search Report for EP Appl. No. 24173519.0 Mailed Oct. 16, 2024 (14 pages.).

* cited by examiner

*Primary Examiner* — Eva Y Puente
(74) *Attorney, Agent, or Firm* — Foley & Lardner LLP

(57) ABSTRACT

Spatial reuse is provided. A device can identify first symbols orthogonal to second symbols, responsive to a receipt of an indication, from a second device, of a transmission of a second message including the second symbols. The device can transmit a first message including the first symbols, simultaneously with the transmission of the second message.

20 Claims, 8 Drawing Sheets

SYSTEMS FOR AND METHODS FOR OVERLAPPING DOWNLINK TRANSMISSIONS

CROSS-REFERENCE TO RELATED APPLICATION

This disclosure claims priority to U.S. Provisional Patent Application No. 63/499,856 filed May 3, 2023, which is incorporated herein by reference in its entirety for all purposes.

FIELD OF THE DISCLOSURE

This disclosure generally relates to systems and methods for communication between communication devices, such as between a station (STA) and an access point (AP).

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large-scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), and code division multiple access (CDMA). As higher data throughput, density of networks, and other changes develop, newer standards are constantly being developed for adoption, such as a progression from IEEE 802.11n to IEEE 802.11ac, ax, or be. Increased network density can lead to a reduction of transmit opportunities, an increase in interference, or otherwise inhibit communication based on interference between or within base station sets (BSS).

SUMMARY

Various client devices can operate as station (STA) devices, or access-point (AP) devices. A downlink may refer to a signal path for communication between two communication devices, such as a communication from an AP device to a STA device in some embodiments. A network including one or more basic service sets (BSS) may include one or more APs and one or more STAs in some embodiments. For example, a BSS can include an AP and one or more STAs. The various APs may communicate with the various STAs. For example, each STA can associate with at least one AP. A BSS can employ spatial reuse to increase throughput, decrease latency, or minimize spectrum use (e.g., to avoid interference with an overlapping BSS or other device). For example, two APs can each simultaneously transmit to an associated STA over a same frequency band. Each of the STAs can receive the transmission addressed thereto. The transmission may include interference from the other of the STAs. It may be challenging to resolve the intended transmission from the interference, where information from one or more of the transmissions is unknown, and a relationship between the transmissions is unknown.

The two APs can coordinate transmission of a simultaneous message having known properties to their associated STAs. For example, one AP can transmit a trigger frame to the other AP. Based on the trigger frame, each of the APs can determine a same transmission time to transmit to their associated STA, and each AP can transmit a separate frame individually addressed to the associated STA. Each of the frames can include predetermined content or properties known to each of the APs. For example, each frame can include a long training field (LTF) that is synchronized and orthogonal to the other frame's LTF, and both frames can have identical guard-intervals and symbol-durations for orthogonal frequency-division multiplexing (OFDM) modulation. The LTF of each frame can comprise of one or more OFDM symbols, (referred to herein as symbols of the LTF or LTF symbols) and both frames can contain an equal number of such LTF symbols. Each STA can receive information from an associated AP and an AP associated with the other STA. For example, the STA can receive an indication of an amount or nature of interference between the associated AP and the other AP based on the receipt of a combination of the LTF symbols transmitted by each AP. The STA can store signal path information associated with the amount or nature of interference. The STA can receive or process subsequent data frames based on the amount or nature of interference. The STA can periodically update a stored amount or nature of interference, such as based on updated frames including orthogonal LTF symbol from the APs, which may be provided periodically, or in response to a network condition or event (e.g., new association, error rate, power level adjustment, or so forth).

In some embodiments, the AP receiving the trigger frame may determine a carrier frequency offset (CFO) or sampling frequency offset (SFO) relative to the AP transmitting the trigger frame. The receiving AP may pre-compensate or otherwise correct for the CFO or SFO during transmission of a subsequent data frame such as a data frame comprising the LTF symbol.

In some embodiments, one or more APs can include information including a quantity of spatial streams for the addressed STA or a quantity of interfering spatial streams (e.g., spatial streams addressed to another STA) in a data frame such as a data frame comprising a paired LTF symbol that is synchronized with or orthogonal to the LTF symbols in another data frame concurrently transmitted from another AP. For example, the AP can include such information in the header of the frame, such as in the signal (SIG) field thereof.

In some embodiments, one or more APs can include information about a modulation and coding scheme (MCS) index used for the interfering spatial streams. For example, the AP can include such information in the header of the frame, such as in the signal (SIG) field thereof.

In some embodiments, the frames including the paired LTF symbol, or a portion thereof are aligned in duration between the APs. For example, a header or portion thereof (e.g., the SIG field) the frames including the LTF symbol are aligned in duration between the two APs.

In some embodiments, the SIG fields of the frames including the paired LTF symbols are transmitted orthogonally (e.g., to avoid interference or provide signal path information). For example, the orthogonal transmission may employ time-multiplexing, frequency-multiplexing, code-multiplexing, spatial-multiplexing, etc.).

In some embodiments, the paired LTF symbols transmitted by each AP are constructed using a distinct set of rows of a P-matrix corresponding thereto (e.g., which are different from the rows used by the other APs). A total number of paired LTF symbols transmitted by each AP may be selected to cover a cumulative number of intended spatial-streams and interfering spatial streams.

In some embodiments, the trigger frame sent between the APs and the data frames including paired LTF symbols sent to the STAs are transmitted within a same TXOP at an interval of a short inter-frame spacing from the preceding frame.

In some embodiments, the AP receiving the trigger frame provides a response frame. The response frame can include an acknowledgement of receiving the trigger frame, information corresponding to a STA addressed by a subsequent data frame (e.g., the data frame including a paired LTF symbol), corresponding data modulation parameters (such as an MCS index, number of spatial streams, etc.).

In some embodiments, each AP initiates a concurrent multiple user request to send-clear to send (MURTS-CTS) exchange with an associated STA responsive to the transmission of the data frame. The MURTS-CTS exchange can be initiated or conducted prior to the transmission of the frames including the LTF symbols.

In some embodiments, one or more APs may perform the systems and methods disclosed herein without receipt, determination, or other indication of a current multiple-input, multiple-output (MIMO) channel state between the other AP and the STA associated with the other STA, excepting path-loss information.

In some embodiments, the payloads of the two data frames partially overlap (e.g., the frames including the paired LTF symbols or subsequent data frames). Partial overlap may include or refer to at least one portion of the frequency spectrum being occupied by both data frames, and another portion of the frequency spectrum being occupied by only one of the data frames.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
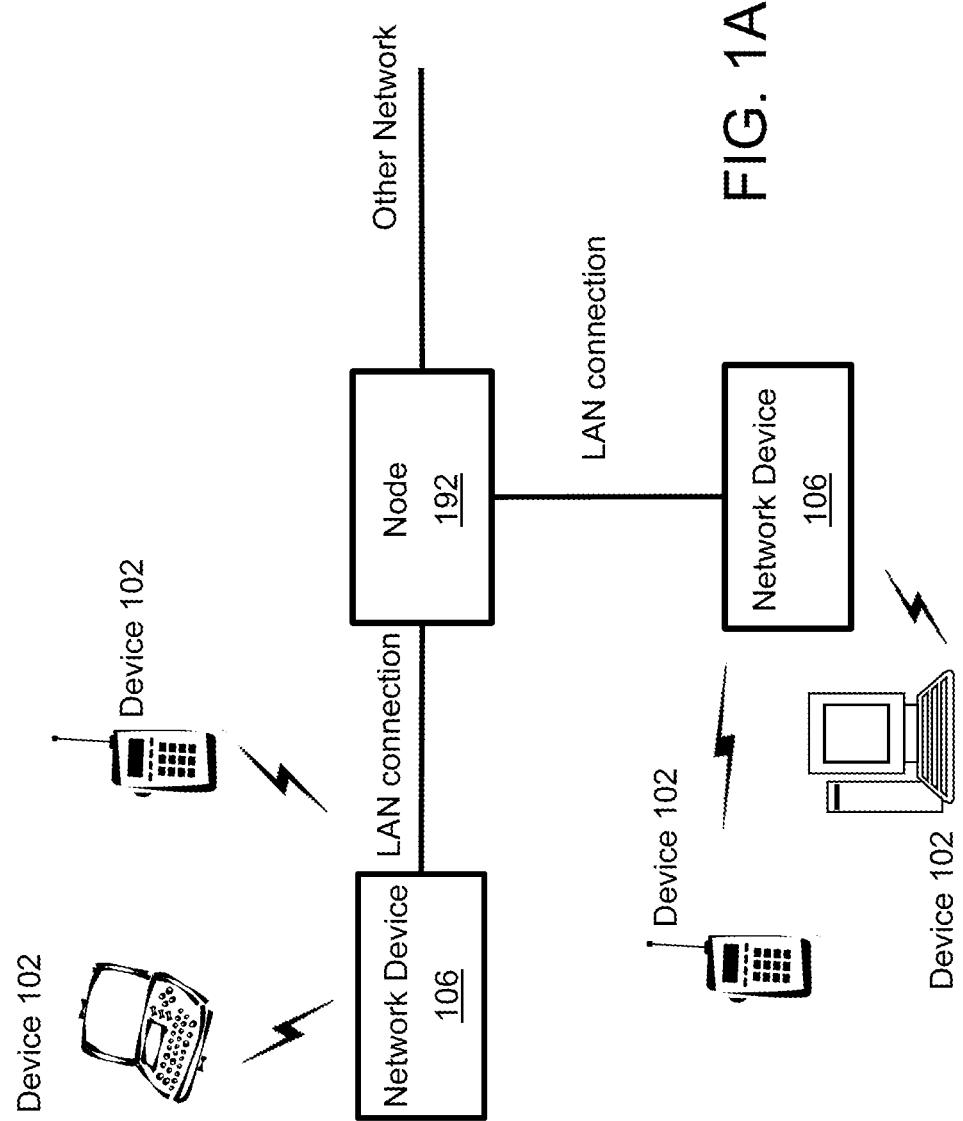
FIG. 1A is a block diagram depicting a network environment including one or more access points in communication with one or more devices or stations, according to some embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

Various embodiments disclosed herein are related to a device. The device may include a circuit configured to determine a first portion of a first received signal, the first received signal further comprising a second portion. The circuit may be configured to determine a first symbol indicated by the first portion of the first received signal. The circuit may be configured to determine a second symbol associated with the second portion of the first received signal, the second symbol being orthogonal to the first symbol. The circuit may be configured to determine, using the second symbol, a characteristic of a signal path. The circuit may be configured to receive a second signal. The circuit may be configured to determine a content of the second signal using the characteristic of the signal path.

In some embodiments, the first symbol and the second symbol are long training field (LTF) symbols. The first received signal can include a first data frame including the first symbol, and a second data frame including the second symbol. The first data frame can include first additional LTF symbols. The second data frame can include second additional LTF symbols, orthogonal to the first additional LTF symbols. In some embodiments, the first symbol can be time synchronized with the second symbol. The first plurality of additional LTF symbols and the second plurality of additional LTF symbols include a same quantity of LTF symbols, which are time-synchronized. The first data frame and the second data frame can employ a same guard interval for orthogonal frequency-division multiplexing modulation. In some embodiments, the first portion of the first received signal is received from a first access point (AP) and is addressed to the device. The second portion of the first received signal can be received from a second AP and may not be addressed to the device. In some embodiments, the device receives the first received signal prior to an expiration of a TXOP of a message exchanged between the first AP and the second AP. The message can identify one or more of the first symbol or the second symbol. In some embodiments, the first symbol is one of a plurality of first symbols, and the second symbol is one of a plurality of second symbols. A quantity of the plurality of first symbols is equal to a quantity of the plurality of second symbols.

Various embodiments disclosed herein are related to a system. The system includes a first device configured to identify a first plurality of symbols orthogonal to a second plurality of symbols. The identification can be responsive to a receipt of an indication, from a second device, of a transmission of a second message comprising the second plurality of symbols. The first device can transmit a first message including the first plurality of symbols, simultaneously with the transmission of the second message.

In some embodiments, the first device can be configured to provide, to the second device, an indication of a transmission of a third message prior to the transmission of the third message. The third message can include the second plurality of symbols. The indication of the transmission of the third message can include a transmission time for the third message. In some embodiments, the first device can be configured to determine, using the indication of the transmission of the second message, frequency synchronization data. The first message can be transmitted using the frequency synchronization data. In some embodiments, the indication of the transmission of the second message is transmitted on a same TXOP as the first message and the second message. In some embodiments, the first device can be configured to transmit a fourth message to the second device, responsive to the receipt of the indication of the transmission of the second message and prior to the transmission of the first message. The fourth message can include transmission parameters of the first message. In some embodiments, the first device and the second device are connected over an interface. The interface can be separate from a signal path for the first message, the second message, and the indication of the transmission of the second message.

In some embodiments, the first message includes a first preamble including an indication of a spatial stream of the first message. The second message can include a second preamble including an indication of a spatial stream of the second message. In some embodiments, the first preamble and the second preamble are aligned in temporal duration. The indication of the spatial stream of the second message can include a quantity of spatial streams of the second message. In some embodiments, the first preamble and the second preamble are orthogonal to each other. The indication of the spatial stream of the second message can include an identity of each spatial stream of the second message. In some embodiments, the second plurality of symbols are a plurality of predefined long training field (LTF) symbols, predefined according to a correspondence to the first plurality of symbols.

Various embodiments disclosed herein are related to a method. The method or various operations thereof can be performed by a first device. The method can include receiving an indication, from a second device, of a transmission of a second message. The second message can include a second symbol. The indication can include a transmission time of the second message. The method can include identifying a first symbol orthogonal to the second symbol. The method can include transmitting a first message comprising the first symbol, simultaneous with the transmission of the second message.

In some embodiments, the method can include identifying, from the indication, first frequency synchronization data corresponding to the second device. In some embodiments, the method can include sending a third message to indicate second frequency synchronization data corresponding to the first device, to the second device. In some embodiments, the method can include sending the second message within a same TXOP in which the indication is received.

The following IEEE standard(s), including any draft versions of such standard(s), are hereby incorporated herein by reference in their entirety and are made part of the present disclosure for all purposes: WiFi Alliance standards and IEEE 802.11 standards including but not limited to IEEE 802.11a™, IEEE 802.11b™, IEEE 802.11g™, IEEE P802.11n™; IEEE P802.11ac™; and IEEE P802.11be™ draft version D3.0 standards. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes embodiments of interference detection and compensation methods and devices.

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) or network devices 106, one or more stations or wireless communication devices 102 and a network hardware component or network hardware 192. The wireless communication devices 102 can for example include laptop computers, tablets, personal computers, and/or cellular telephone devices. The details of an embodiment of each station or wireless communication device 102 and AP or network device 106 are described in greater detail with reference to FIGS. 1B and 1C. The network environment can be an ad hoc network environment, an infrastructure wireless network environment, a subnet environment, etc. in one embodiment. The network devices 106 or APs can be operably coupled to the network hardware 192 via local area network connections. Network devices 106 are 5G base stations in some embodiments. The network hardware 192, which can include a router, gateway, switch, bridge, modem, system controller, appliance, etc., can provide a local area network connection for the communication system. Each of the network devices 106 or APs can have an associated antenna or an antenna array to communicate with the wireless communication devices in its area. The wireless communication devices 102 can register with a particular network device 106 or AP to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to network device 106 or AP.

In some embodiments, a network device 106 or AP includes a device or module (including a combination of hardware and software) that allows wireless communication devices 102 to connect to a wired network using wireless-fidelity (WiFi), or other standards. A network device 106 or AP can sometimes be referred to as a wireless access point (WAP). A network device 106 or AP can be implemented (e.g., configured, designed, and/or built) for operating in a wireless local area network (WLAN). A network device 106 or AP can connect to a router (e.g., via a wired network) as a standalone device in some embodiments. In other embodiments, network device 106 or AP can be a component of a router. Network device 106 or AP can provide multiple devices access to a network. Network device 106 or AP can, for example, connect to a wired Ethernet connection and provide wireless connections using radio frequency links for other devices 102 to utilize that wired connection. A network device 106 or AP can be implemented to support a standard for sending and receiving data using one or more radio frequencies. Those standards, and the frequencies they use can be defined by the IEEE (e.g., IEEE 802.11 standards). A network device 106 or AP can be configured and/or used to support public Internet hotspots, and/or on a network to extend the network's Wi-Fi signal range.

In some embodiments, the access points or network devices 106 can be used for (e.g., in-home, in-vehicle, or in-building) wireless networks (e.g., IEEE 802.11, Bluetooth, ZigBee, any other type of radio frequency-based network protocol and/or variations thereof). Each of the wireless communication devices 102 can include a built-in radio and/or is coupled to a radio. Such wireless communication devices 102 and/or access points or network devices 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points or network devices 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
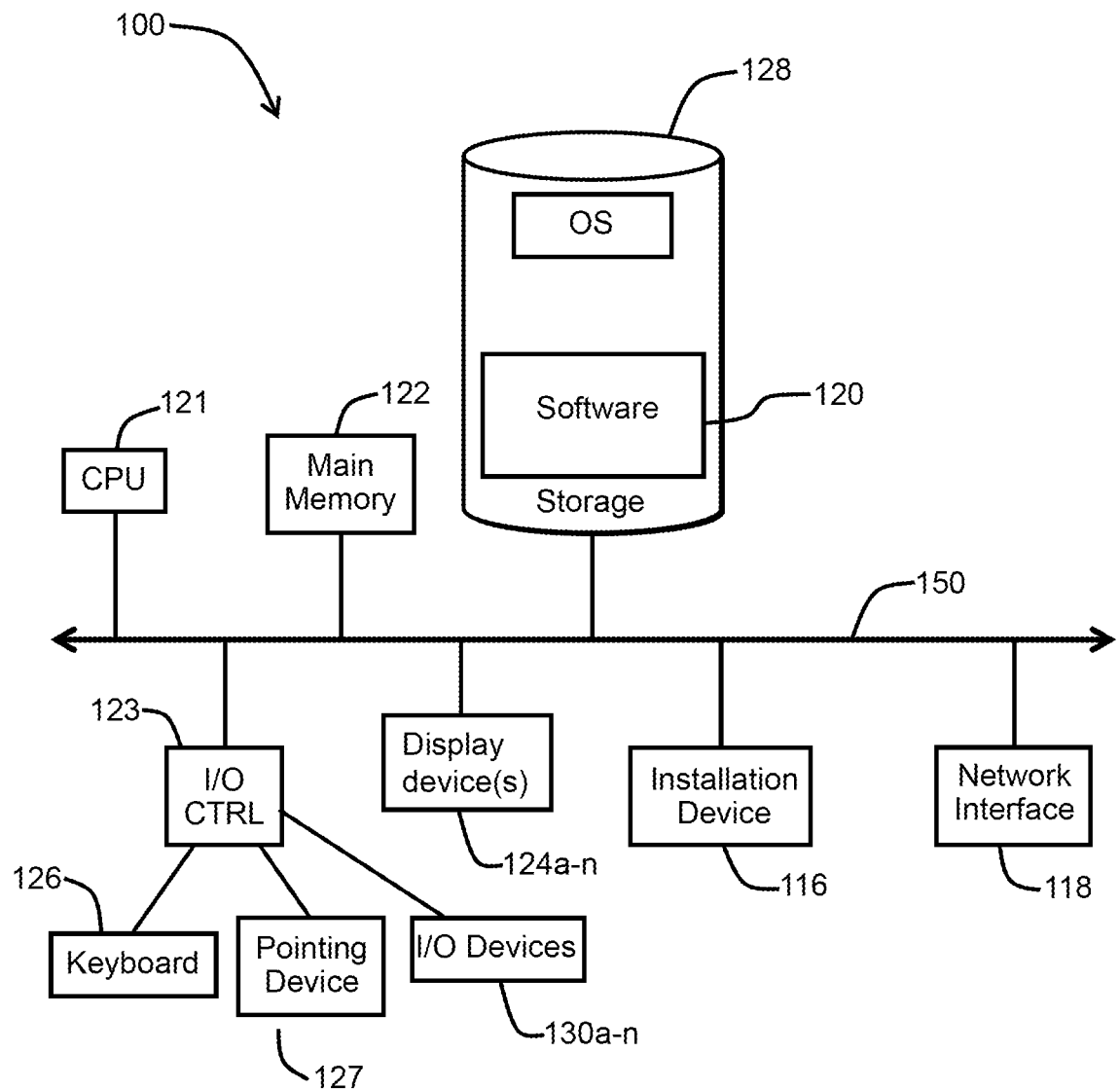
FIGS. 1B and 1C are block diagrams depicting computing devices useful in connection with the methods and systems described herein, according to some embodiments.
Figure 1C:
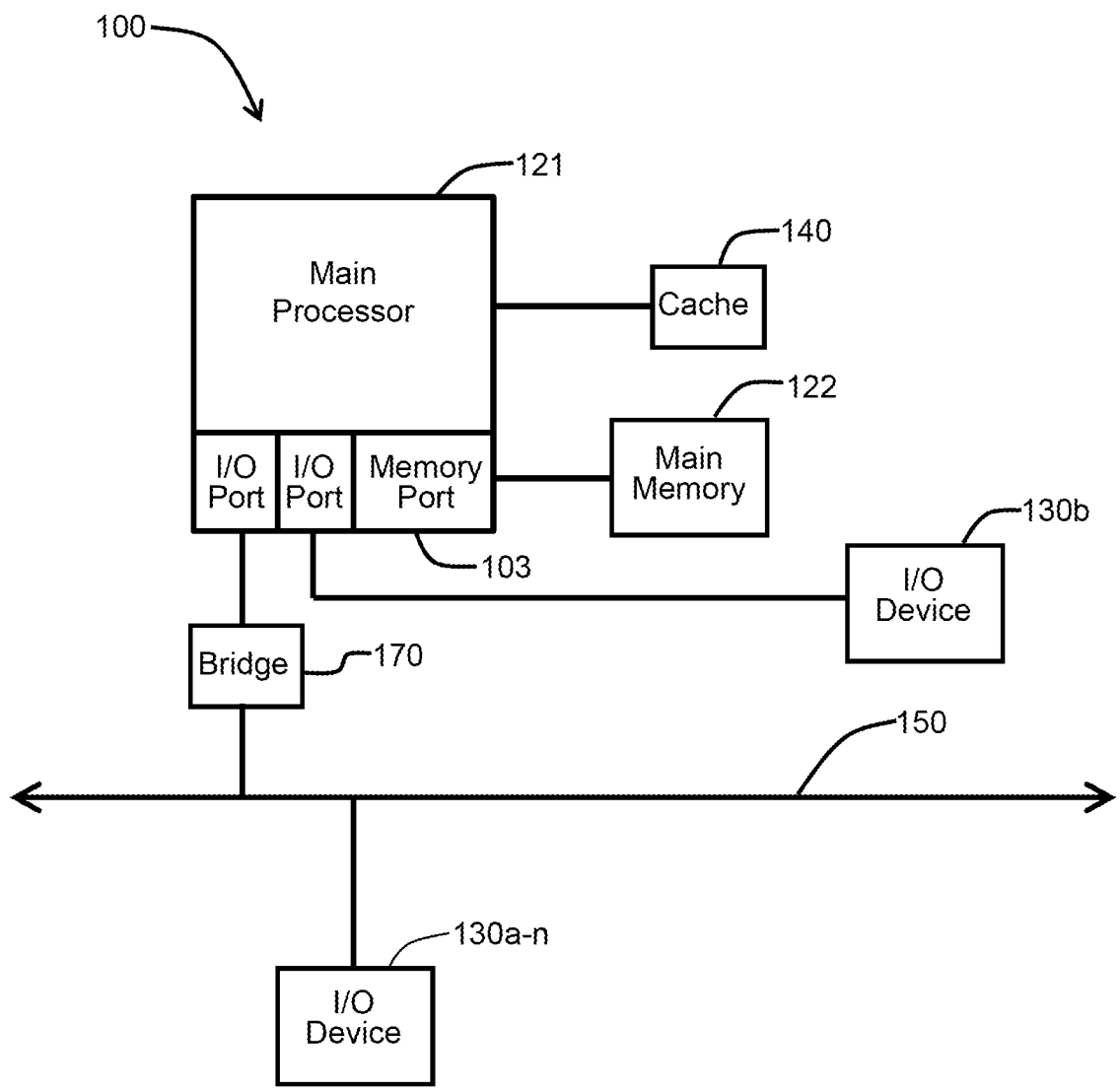

The communications device(s) 102 and access point(s) or network devices 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or network device 106. As shown in FIGS. 1B and 1C, each computing device 100 includes a processor 121 (e.g., central processing unit), and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit or processor 121.

The central processing unit or processor 121 is any logic circuitry that responds to, and processes instructions fetched from the main memory unit 122. In many embodiments, the central processing unit or processor 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above-described memory chips, or any other available memory chips capable of operating as described herein. In the embodiment shown in FIG. 1B, the processor 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit or processor 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer or computer system 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to a network through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple display devices 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a fiber optic bus, a Serial Attached small computer system interface bus, a USB connection, or a HDMI bus.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system or computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Interference, Training, Detection, and Compensation

Disclosed herein are systems and methods of compensation for spatial reuse of downlinks. For example, an AP can coordinate with another AP to employ spatial reuse with respective non-APs (e.g., STAs) associated with each AP. Each of a first AP and a second AP can provide simultaneous messages (e.g., data frames) to the respective STAs. The messages can include long training field (LTF) symbols which are orthogonal to each other, which may be referred to as paired LTF symbols. Each STA can receive a signal configured to convey statistical knowledge about interference caused by the communication with the other STA. For example, the signal can include a superimposition of the two data frames (e.g., paired LTF symbols thereof). Each STA can determine information about a signal path including the other STA based on the signal. For example, each STA can determine a first and second portion of the signal based on the paired LTF symbols to determine information associated with a pathloss, delay, or other characteristic of interference received from the AP which addresses the other STA. The STA may thereafter determine a transmission parameter of a subsequent message (e.g., data frame) based on the characteristic of the interference, which may aid in disaggregating a portion of a signal addressed to a STA from another portion of the signal (e.g., an interfering portion).

For clarity of the disclosure, before proceeding with further description of the systems and methods provided herein, illustrative descriptions of various terms are provided:

A TXOP may refer to or include the time duration during which at least one AP and at least one non-AP (e.g., STA) can exchange frames, such as after gaining control of the transmission medium through a contention process in some embodiments. An expiration of the TXOP may refer to a closure of the TXOP, based on a completion of a predefined temporal duration of the TXOP which may vary according to a standard of communication, a frequency band, or so forth in some embodiments. A transmission time may refer to or include an initiation time for a transmission, or other time associated with the transmission in some embodiments. For example, the transmission time may refer to a time corresponding to a detection of the transmission at a receiver, or a time of transmission by the transmitter. The transmission time may include or be based on an offset from another time (e.g., for clock correction, channel delay, or so forth).

A data frame may refer to or include a predefined data structure including information for transmission, in some embodiments. For example, the data frame can include (or omit) a preamble, payload, or other components. A frame is not limited to a particular level of an open systems interconnect (OSI) model. For example, the data frame can include a preamble have a signal (SIG) field, which may sometimes be referred to as a "layer one" or "PHY" component. A preamble may refer to or include a portion of a message transmitted in advance of a payload, in some embodiments. For example, a WI-FI frame can include a preamble including a signal (SIG) field. The signal field can include rate information, length information, or other control information. Either of the preamble or the payload can include one or more symbols. A symbol can refer to or include a finite duration waveform which carries information, in some embodiments. The various symbols may be separated by a guard interval. A guard interval can include a temporal or frequency spacing between two or more symbols of a transmission, in some embodiments. The symbols can include a long training field (LTF) symbol. An LTF symbol can include a predefined symbol such that upon receipt, by a receiver, the receiver can determine a characteristic of a signal path, in some embodiments. The signal path may refer to a communications link between two devices, in some embodiments. For example, the signal path can be an intended signal path between a transmitter and a receiver, or an unintended signal path (e.g., interference) between the transmitter and another receiver. A characteristic of a signal path may refer to a time delay, frequency attenuation, phase shift, or other modulation of a signal between a transmitter and a receiver, in some embodiments. For example, the characteristic can include characteristics of a medium (e.g., air, Ethernet cable), transmit chain (sometimes referred to as a TX chain), or receive chain (sometimes referred to as an RX chain).

A device can include or be associated with transmission parameters for symbols or frames for transmission. The transmission parameter may refer to time synchronization or frequency synchronization data, in some embodiments. For example, a device can time-synchronize or frequency-synchronize data. Time synchronization may refer to adjusting a transmission time between devices to reduce a time difference between temporally overlapping messages. Frequency synchronization may refer to adjusting a transmission frequency, in some embodiments. For example, an adjustment can include a carrier frequency offset (CFO), sampling frequency offset (SFO), or adjustment or adoption of a modulation and coding scheme (MCS). Either of time-synchronization or frequency-synchronization can be adjusted or stored by an adjustment to an RX chain or TX chain (e.g., a pre-equalization value or transfer function), or another digital signal processing convolution or other operation applied to a received signal, or a signal incident to a transmission thereof. In some embodiments, the information can be stored in a discrete memory, or converted between devices (e.g., to adjust an RX or TX power thereof).

An interface may refer to or include a communications link available between two or more devices, in some embodiments. For example, the interface can include any number of wired or wireless communications links, channels, subcarriers or so forth (e.g., a backhaul or auxiliary connection).

Orthogonality may refer to features which are perpendicular or non-overlapping in one or more phase spaces, according to some embodiments. Particularly, orthogonal signals may refer to signals having low mutual interference which may allow them to be distinguished at one or more receivers, in some embodiments. For example, the orthogonal signals can be propagated by orthogonal subcarriers or channels employing a time-division, code-division, or orthogonal frequency division multiplexing (OFDM). OFDM may refer to a modulation scheme that provides information across orthogonal subcarriers, in some embodiments.

A spatial stream may refer to a channel of a multiple-input or multiple-output communication system, in some embodiments. Multiple spatial streams may temporally or spectrally overlap with each other, such as to increase throughput between devices.

A "STA" may refer to any device for communicating in communication system and includes but is not limited to a fixed, portable, or mobile laptop, desktop personal computer, personal digital assistant, access point, workstation, wearable device, smart phone, or Wi-Fi phone in some embodiments. An "access point" (AP) may refer to a device for communicatively coupling one or more "non-AP" devices (e.g., a client device) to a network in some embodiments. More specifically, an AP may enable non-AP devices to connect and communicate with a network. In some embodiments an AP may be a "wireless access point" (WAP) configured to enable wireless communication between non-AP devices. An AP includes but is not limited to a mobile, portable, or fixed hot spot, router, bridge, or other communication device.

A radio may refer to a device to wirelessly communicate data, in some embodiments. A band may refer to a predefined portion of wireless spectrum, in some embodiments. For example, a wireless band can include contiguous spectrum according to as standard such as 5030-5990 MHz, 5945-7125 MHz, 2401-2495 MHz, or the like. A "channel" may refer to a subdivision of a band for wireless communication between radios or another channel for communication such as a wired link for communication (e.g., Ethernet). The channel can include a frequency subdivision, time-subdivision, combination thereof, or the like. An overlapping basic service set (OBSS) communication may refer to a communication transmitted or received by a device of a first basic service set (BSS) detected by a device of a second BSS in some embodiments. Content of a message may refer to information in a body of a message, header of a message, preamble of a message, or the like in some embodiments.

Figure 2:
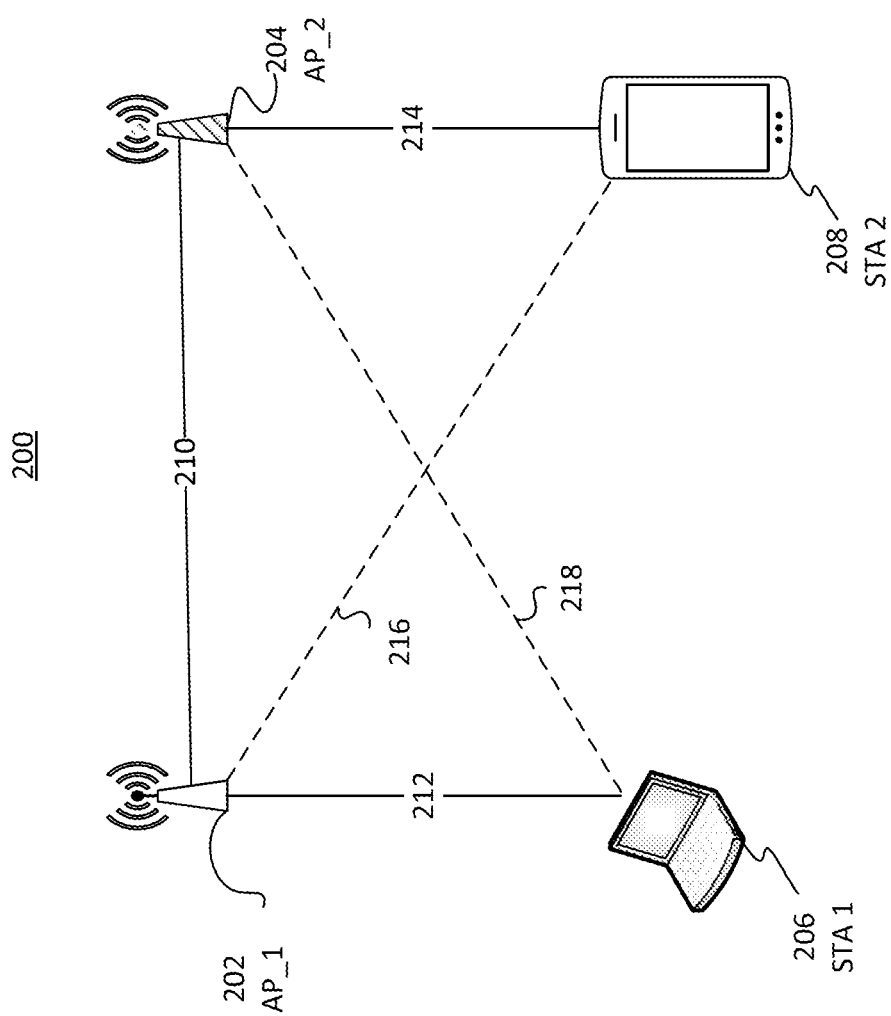
FIG. 2 illustrates signal path diagram for a wireless network, according to some embodiments.

With reference to FIG. 2, a signal path diagram 200 for a wireless network is illustrated, according to some embodiments. The wireless network includes a first AP 202 and a second AP 204. Each AP can be associated with any number of STAs. For example, the first AP can be associated with a first STA 206, and the second AP 204 can be associated with the second STA 208. An AP signal path 210 can communicatively couple the first AP 202 with the second AP 204 over an interface. For example, the AP signal path 210 can include one or more wired or wireless links of the interface. The AP signal path 210 can include a signal path for transmission from the first AP 202 to the second AP 204, and another signal path for transmission from the second AP 204 to the first AP 202 (e.g., the AP signal path 210 may be include multiple channels, a bidirectional channel, or include a channel which is arbitrable between the first AP 202 and the second AP 204). In some embodiments, the first AP 202 and the second AP 204 can determine or manage TXOPs of the network. For example, the respective APs can coordinate spatial reuse based on network congestion, error rates, a simultaneous availability of data and so forth.

The first AP 202 and the second AP 204 can coordinate spatial reuse of time and frequency associated with the wireless network. For example, the first AP 202 or the second AP 204 can convey a trigger frame over the AP signal path 210 to the other of the first AP 202 or the second AP 204. Responsive to the receiving the trigger frame, the receiving AP can coordinate spatial reuse of the first downlink signal path 212 and the second downlink signal path 214. The spatial reuse can be based on pre-defined rules, data contained within the trigger frame, or other frames conveyed between the first AP 202 and the second AP 204 responsive to the trigger frame. For example, any of a delay, time, offset, or LTF symbol selection may be determined, arbitrated, or otherwise triggered over the AP signal path 210. Thereafter, the first AP 202 can convey a data frame to the first STA 206 via the first downlink signal path 212. Simultaneously, the second AP 204 can convey another data frame to the second STA 208 via the second downlink signal path 214. The simultaneous frames include at least one temporally overlapping portion. For example, one or more paired LTF symbols can overlap with each other. The paired LTF symbols may be orthogonal to each other. The paired LTF symbols may be synchronized with each other.

The first downlink signal path 212, second downlink signal path 214 (or other downlink signal paths) can include one or more bands. For example, a 2.4 GHz band, a 5 GHz band, or a 6 GHz band. Each band may be subdivided into channels, which may be combined (e.g., bonded), or divided into various sub-channels which may include or be referred to as subcarriers, resource units, or the like. A signal path characteristic such as for the first downlink signal path 212, or an associated interference signal path may correspond to any combination or division of wireless links (e.g., the 5 GHz band, bonded channels thereof, or sub-channels thereof).

Based on the coordination with the first AP 202, the second AP 204 can convey a wireless message to the second STA 208 via the second downlink signal path 214. The first downlink signal path 212 and the second downlink signal path 214 may be referred to as addressed paths, wherein the signal paths correspond to messages addressed from the transmitter (e.g., the first AP 202 or the second AP 204) to the receiver (e.g., the first STA 206 or the second STA 208). The first AP 202 or the second AP 204 can employ beamforming, power adjustments, or other techniques to effect communication with an addressed recipient.

At least a portion of a signal transmitted to an addressed recipient may be received by another network device. For example, a portion of a signal corresponding to a message sent from the first AP 202 to the first STA 206 may propagate along a first interference path 216 causing the signal to be received by the second STA 208. Likewise, a portion of a signal corresponding to a message sent from the second AP 204 to the second STA 208 may propagate along a second interference path 218 causing the signal to be received by the first STA 206. The magnitude, phase, or other characteristics of the interference paths may vary according to a transmit or receive power, environmental conditions, relative position of the devices, directional or non-directional techniques employed by the AP or STA (e.g., beamforming), and so forth. Such parameters may vary over time, frequency, power density, etc. Determining such characteristics, by an STA, may aid in a disaggregation of signals which overlap in frequency or time, such as among subcarriers of an OFDM schema, as is employed in various wireless communication protocols.

The second interference path 218 can interfere with communication between the first AP 202 and the first STA 206. For example, the first STA 206 can receive a signal including a first component corresponding to a message from the first AP 202 to the first STA 206, and a second component corresponding to a message from the second AP 204 to the second STA 208. To disaggregate the contributions of the respective APs, the first STA 206 can increase a receive signal gain, decrease a data rate, request a retransmission of a frame, or otherwise increase power use, decrease data rates, increase latency, or so forth. However, such actions may increase overall network congestion, leading to further interference with further signals from various APs or STAs proximal to the first STA 206. Thus, in some instances, it may be preferable to disaggregate the contributions of the respective APs according to a characteristic of a signal path between each of the first AP 202 and the second AP 204. For example, the first STA 206 can receive a symbol from the first AP 202 and another symbol from the second AP 204. The symbols may be referred to as paired symbols. A relationship between paired symbols may be predefined or otherwise identifiable such that the first STA 206 can determine an identity of a paired symbol received along the second interference path 218 or an identity of a paired symbol received along the first signal path 212.

A STA (e.g., the first STA 206 or second STA 208) can determine an identity of a paired symbol based on a message from the first AP 202 or the second AP 204 (e.g., a preamble thereof such as a signal (SIG) field). In some embodiments, the SIG field is common to the first AP 202 and the second AP 204, such as based on coordination between the respective APs 202, 204. The common SIG field can provide an indication of each symbol for the respective APs 202, 204, such that a STA can receive an indication of each of an LTF symbol pair.

In some embodiments, the first AP 202 or the second AP 204 can transmit different messages including different SIG fields or other preambles, wherein each of the messages may be individually decodable at each receiving STA. For example, an encoded data rate or symbol density can be selected to aid a receipt thereof, at an addressed or other STA (e.g., may be a lower data rate, relative to payload data). In some embodiments, all or a portion of the different messages may be configured as orthogonal or non-orthogonal. For example, different SIG fields or other preambles of the first AP 202 or the second AP 204 can include a common portion and an orthogonal portion. The common portion can include an indication of how an orthogonal portion is encoded. The orthogonal portion can include the symbol information, such that a STA can receive information from one or more of the messages. In some embodiments, the symbol selection can be determined according to a predefined (e.g., seeded) sequence, wherein a receipt of a first signal, sequence number, or other seed can be provided to a STA, whereupon the STA can determine an identity of a predefined next or paired symbol via a lookup table or other memory device.

Paired symbols may be partially or fully orthogonal to each other. For example, paired symbols can be predefined training symbols configured to provide an indication of characteristics of respective signal paths (e.g., channel estimation). More particularly, the paired symbols can include long training field (LTF) symbols.

The first STA 206 can determine (e.g., identify) either of the paired symbol from the first AP 202 or the second AP 204 (e.g., a symbol from a message addressed to the first STA 206 or the second STA 208). For example, in some instances, the symbol from the first AP 202 can be determined, and a corresponding orthogonal (paired) symbol from the second AP 204 can be identified based on the SIG field identification of a message from either of the first AP 202 or second AP 204. By comparing the predefined symbol (e.g., the paired symbols from the first AP 202 and the second AP 204) to the received signal, the first STA 206 can determine signal path characteristics associated with the received signal. For example, the signal path characteristic of the first downlink signal path 212 can be determined relative to another signal path (e.g., a frequency attenuation, time delay, phase shift, or other signal characteristic relative to the second interference path 218).

Thereafter, the first STA 206 can receive a second symbol, such as a symbol incident to another message including a payload or another portion of the same message (e.g., a payload of a data frame provided subsequent to the symbol, such as where the symbol is provided in the preamble). The first STA 206 can receive the payload and determine a content thereof, based on the previously determined signal path characteristics. For example, the first STA 206 can process a received signal based on the signal path characteristic, or adjust a portion of an RX chain to attune to the signal path characteristics of an associated AP (e.g., the first AP 202, as depicted). For example, the first STA 206 can receive a payload including constituent portions from the second AP 204 and another AP, the respective portions being non-orthogonal to each other.

The wireless network can include further AP, STA, and other network devices, with further signal paths therebetween. For example, another instance of the signal path diagram 200 may depict signal paths for a subset of the devices of a wireless network, wherein further signal paths between further devices may be included. For example, the second AP 204 may include a signal path to a third, fourth, or fifth STA (not depicted). Further addressed and interference paths may correspond to each STA. An AP may be associated with multiple STAs. A STA may be associated with multiple AP. An AP may perform spatial reuse with regard to multiple STAs. For example, a multiple radio AP may provide LTF symbols to multiple associated STAs prior to simultaneous transmission thereto such that the various STAs may determine an interference path between an AP associated with each respective STA, and the other of the STAs. Moreover, the wireless network can be or include any number of BSS (e.g., multiple BSS). For example, respective AP of overlapping BSSs (OBSSs) may employ the systems and methods disclosed herein. The operations disclosed herein are not limited to any particular device. For example, a device may be configurable to operate as either an AP or a STA, as in the case of a dual mode device or an ad-hoc network, where four instances of a same device can operate as the first AP 202, second AP 204, first STA 206, and second STA 208.

Figure 3:
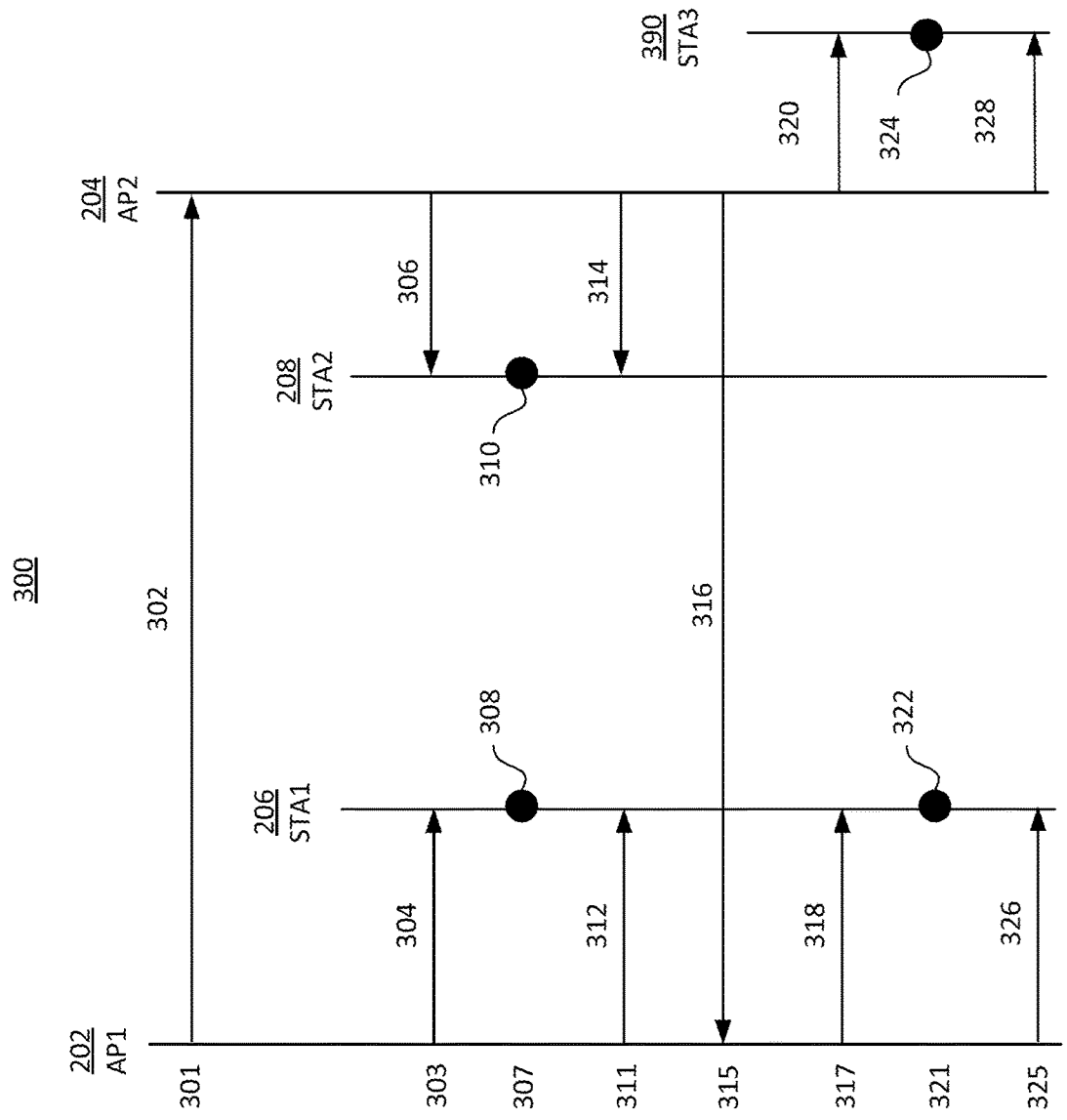
FIG. 3 is a sequence diagram for spatial reuse communication between an access point (AP) and a non-AP, according to some embodiments.
Figure 4:
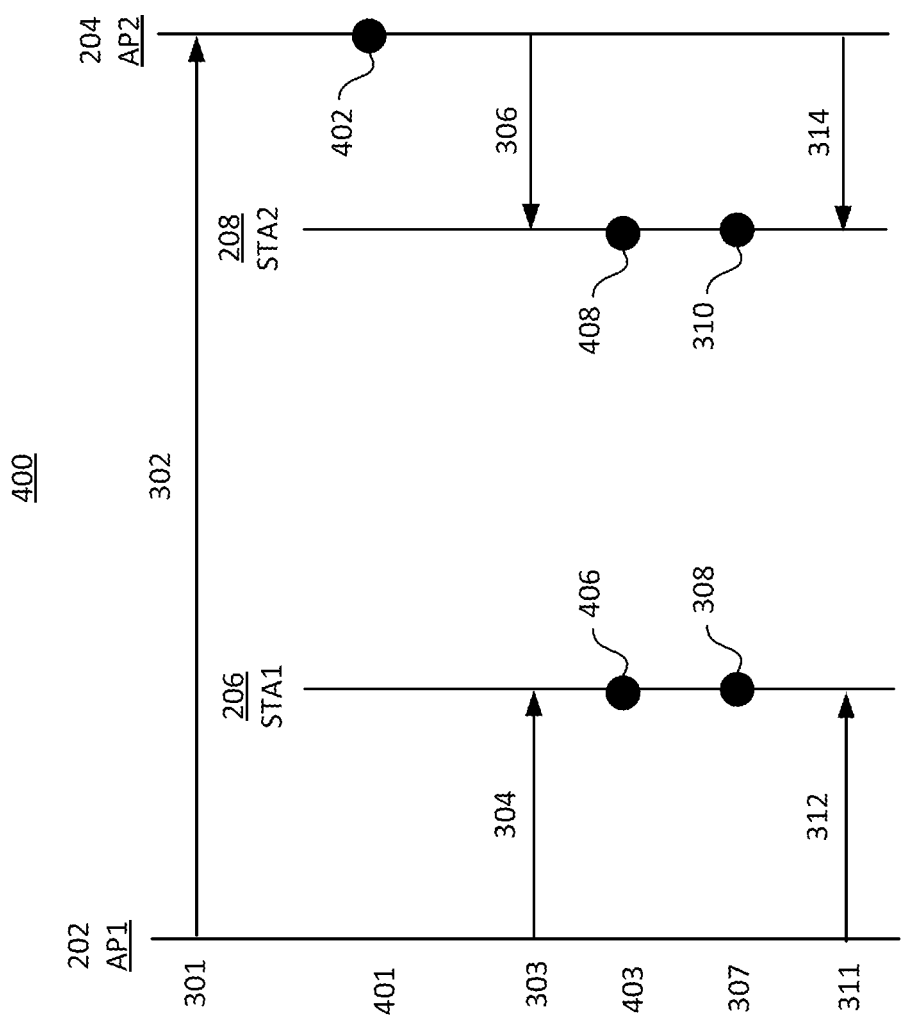
FIG. 4 is a sequence diagram for spatial reuse communication between an access point (AP) and a non-AP, according to some embodiments.
Figure 5:
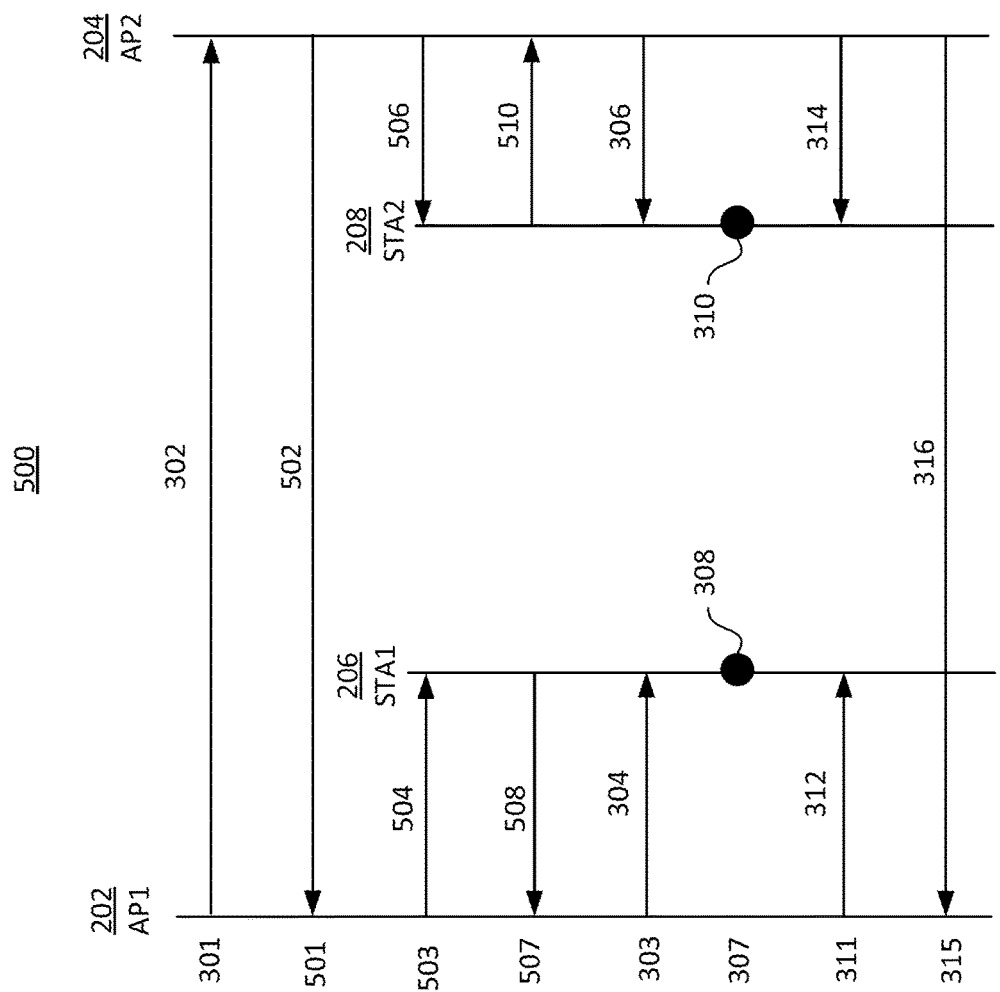
FIG. 5 is a sequence diagram for spatial reuse between an access point (AP) and a non-AP, according to some embodiments.

FIG. 3 depicts a sequence diagram 300 for communication between various devices of a network, such as a wireless network. FIGS. 4 and 5, hereinafter, depict various operations in related sequence diagrams 400, 500. The depicted operations may be employed in combination or individually. That is, according to various embodiments, the depicted operations may be employed with each other, with other operations disclosed herein, or further operations employed in wireless networks generally. The depiction of various operations on the sequence diagrams 300, 400, 500 of FIGS. 3, 4, and 5 are merely intended to enhance the readability and clarity of the figures, and are not indicative of a preferred or coupled combination of features.

Merely for brevity of description, the sequence diagram 300 refers to the nodes of a wireless network to include the devices described with regard to FIG. 2. However, the sequences can be performed with various assortments of STA and AP. For example, like the STA and AP of FIG. 2, the STA and AP may be included in one more for basic service sets. Further, the various operations of the sequence diagram are not limited to the operations described herein. Operations may be omitted, added, substituted, or modified.

At operation 301, the first AP 202 conveys a trigger frame 302 to the second AP 204. The first AP 202 can generate the trigger frame 302 according to an expiration of a predefined period, a network utilization exceeding a threshold, an error rate exceeding a threshold (e.g., indicating interference), a detection of downlink traffic with another AP (e.g., the second AP 204) to one or more STA, a prior negotiation with the second AP 204 indicating a mutual ability to participate in downlink spatial reuse employing paired LTF symbols, or an indication of network congestion such as a response to one or more CCA (e.g., according to a counter or other longitudinal analysis). In some embodiments, the first AP 202 conveys the trigger frame upon an identification of a payload to be conveyed to the first STA 206. In some embodiments, the first AP 202 conveys the trigger frame 302 upon an association of the first STA 206, which may lower latency of a message upon a subsequent receipt of information to convey to the first STA 206. In some embodiments, the first AP 202 conveys the trigger frame 302 to various APs periodically (e.g., to acclimate to time-variant channel characteristics, such as changing environmental conditions or a spatial position of a mobile AP or STA). The trigger frame 302 may be provided immediately prior to the data frames 304, 306, or further information may be exchanged between the first AP 202 and second AP 204 prior to the provision of the data frames 304, 306. In some embodiments, the second AP 204 provides an indication not to proceed with the data frames 304, 306, such as based on a configuration table disabling the feature, non-support of the feature, or the like. In some embodiments, the second AP 204 provides, to the first AP 202, communication parameters for the second data frame 306 (e.g., STA information such as MCS, number or identity of spatial streams, and so forth). For example, the indication can include a response to the trigger frame 302 or a non-response to the trigger frame 302.

At operation 303, responsive to the trigger frame 302, the first AP 202 provides a data frame 304 to the first STA 206 and the second AP 204 provides a data frame 306 to the second STA 208. The second data frame 306 can include content configured to allow the first STA 206 to determine information associated with a signal path between the second AP 204 and the first STA 206. For example, the first STA 206 may receive the first data frame 304 superimposed with interference from the second data frame 306. The first data frame 304 and second data frame 306 can each include predefined symbols which are known to one or more other STA or AP, and include orthogonal portions. For example, the first data frame 304 and the second data frame 306 can each include a different LTF symbol (e.g., paired LTF symbols). The paired LTF symbols can be orthogonal to each other. The paired LTF symbols can be synchronized with each other. Any of the first AP 202, the second AP 204, the first STA 206 or the second STA 208 can have prior information associated with the LTF symbol employed, such as the particular symbol which will be transmitted, or a finite set of LTF signals which the AP may select the LTF symbol from. For example, each of the first AP 202 and the second AP 204 can store a predefined set of LTF symbols. The first AP 202 can select a portion of the predefined set of signals corresponding to an initiating AP, and the second AP 204 can select a corresponding portion of the predefined set of signals corresponding to an AP receiving the trigger frame of operation 301.

Referring further to the selection or generation of paired LTF symbols, to provide signal characteristic information for an addressed and interfering spatial stream, the APs can select or generate LFT symbols. Each AP can select a distinct set of portions from a pilot symbol (P-symbol) data structures used to construct (e.g., generate) LTF symbols, such that symbols generated or selected by the first AP 202 and second AP 204 are different. The total number of paired LTF symbols transmitted by each AP can be based on the number of intended/addressed signal paths and the number of interfering signal paths. These paired LTF symbols can be time-wise orthogonal, alternated between different APs, or interleaved in frequency to accommodate the various signal paths. In some embodiments, the LTF symbols can employ a modulation scheme. In an illustrative example, binary phase shift keying (BPSK) in employed, using a +1/−1 mapping. For example, each AP can modulate a transmitted LTF symbol with a unique +1/−1 sequence different from and orthogonal to other LTF symbols of other AP. A phase of 0 degrees may represent a '1,' while a phase of 180 degrees may represent a '0.' Such a selection can reduce a complexity of channel estimation and synchronization performed by the STA, though various other operations may be associated with other attributes which may be beneficial in at least some instances or embodiments.

At operation 307, the first STA 206 and the second STA 208 determine a first signal path characteristic information 308 and second signal path characteristic information 310, respectively. For example, the first signal path characteristic information 308 can include signal path characteristics between the first AP 202 and the first STA 206 and between the second AP 204 and the first STA 206. The second signal path characteristic information 310 can include signal path characteristics between the second AP 204 and the second STA 208 and between the first AP 202 and the second STA 208. The first STA 206 and the second STA 208 can store the respective signal path characteristic information 308, 310. For example, the stored information can include information which is embedded into an RX signal chain by an adjustment of various values, or which is stored in a discrete memory device. The stored information can include signal path characteristics for any number of other signal paths, such as other downlink channels between further APs and further STAs. The first STA 206 and second STA 208 may thus characterize various signal paths such that the STAs can subsequently disaggregate various signal portions to determine a component from an intended (e.g., addressed) and unintended (e.g., interfering) signal path. The storage can include an indication of a time (e.g., a stored timestamp, counter reset, or so forth). For example, the indication of the time can be employed to subsequently re-acquire signal path characteristics. The STAs can determine which of a plurality of signal paths to maintain. For example, the STAs can deprecate or refresh a signal path based on recency (e.g., by comparing to a threshold for elapsed time), or magnitude (e.g., by comparing to a magnitude threshold or other indicia of interference such as an associated bit error rate).

At operation 311, a third data frame 312 and fourth data frame 314 are provided to the first STA 206 and second STA 208, respectively. The third data frame 312 and fourth data frame 314 may include information which is not known to the first STA 206 or second STA 208. The frames can include information related to a signal path the frames traverses (e.g., an originating AP, a number of intended or unintended spatial streams, an addressed STA, or so forth), or such information can be otherwise determined to disaggregate intended unintended portions of a signal. For example, the third data frame 312 and fourth data frame 314 may include latency sensitive information, information on a congested network, or other information (e.g., virtual reality streaming data, email application data, or so forth). Such information may include non-orthogonal information (e.g., arbitrarily oriented information). The first STA 206 and second STA 208 can adjust, receive, or otherwise process content of the third data frame 312 and fourth data frame 314 based on the first signal path characteristic information 308 and second signal path characteristic information 310 determined at operation 307. For example, the first signal path characteristic information 308 and second signal path characteristic information 310 can disaggregate a portion of a signal received over an interference path from a portion of a signal received over an addressed path, which may improve a throughput, latency, error rate, signal to noise ratio, or various parameters of a connection.

The operations described herein can be repeated for various APs, STAs, frequencies, channels, sub-channels, combinations of channels, etc. For example, the first STA 206 and second STA 208 may re-associate with their respective AP over a different channel (e.g., a different channel of a same bandwidth, or a channel including additional or fewer subcarriers), and repeat each of operations 301, 303, 307, and 311 with regard to signal paths corresponding to the new channels. Another example of downlink spatial reuse is provided hereinafter, with reference operations 315, 317, and 325, between the first AP 202 and the first STA; and the second AP 204 and a third STA.

At operation 315, the second AP 204 can provide a trigger frame 316 to the first AP 202 responsive to information associated with the third STA 390. At operation 317, the second AP 204 and the first AP 202 can convey a fifth data frame 318 and sixth data frame 320, respectively. The fifth data frame 318 and sixth data frame 320 may be configured to include content configured to allow the first STA 206 to determine information associated with a signal path between the second AP 204 and the first STA 206, when the second AP 204 is communicating with the third STA 390, and the third STA 390 to determine information associated with a signal path between the first AP 202 and the third STA 390 when the first AP 202 is communicating with the first STA 206.

Thereafter, at operation 321, the first STA 206 and the third STA 390 can determine third information 322 and fourth information 324 about corresponding interference paths such that at operation 325, the first STA 206 and third STA 390 can disaggregate a portion of a received signal which is received from each of a seventh data frame 326 and eighth data frame 328 (e.g., a portion received over an addressed path and a portion received over an interference path). The first STA 206 can thereafter select one of the first signal path characteristic information 308 or the third information 322 to receive further data frames conveyed employing spatial reuse between the second AP and either of the second STA 208 or the third STA 390. For example, the first STA 206 can detect the spatial reuse based on the interference path, or the first AP 202 can provide an indication of spatial reuse to the first STA 206.

FIG. 4 is a sequence diagram 400 for communication between various devices of a network, such as a wireless network. A subset of elements of FIG. 3 are repeated, to avoid repetition of the description. However, like other examples provided herein, the operations of FIG. 4 may be a separate instance of operations or devices relative to FIG. 3. Indeed, the operations of FIG. 4 may be performed according to various instances of signals, devices, and networks.

Each of the first AP 202 and the second AP 204 can include or interface with a synchronization server, such as a network time protocol (NTP) sever. The first AP 202 or the second AP 204 may be configured to align a time (e.g., coordinated universal time (UTC)). Further, the first AP 202 or the second AP 204 can adjust a carrier frequency offset (CFO), or sampling frequency offset (SFO)). The first AP 202 or the second AP 204 can convey an indication of the synchronization over the AP signal path 210. For example, a current time, offset therefrom, or frame which may be employed by the receiving AP to determine an offset may be conveyed over the AP signal path 210. The information can be explicit or otherwise provided, such as by inspection of the trigger frame.

Referring now to operation 401, the second AP 204 determines frequency synchronization data 402 from a message received from the trigger frame 302. For example, the second AP 204 can correlate a known sequence of the trigger frame 302 (e.g., a preamble thereof), and determine the frequency synchronization data 402 therefrom. The angle or phase of a difference therebetween may be used for CFO estimation. The comparison may be performed in a frequency domain or time domain space. The second AP 204 can detect the SFO based on, for example, phase changes to pilot tones of the trigger frame or symbol timing offsets (STO). In some embodiments the second AP 204 can determine the frequency synchronization data 402 based on a plurality of messages, such as a plurality of trigger frames 302, or a plurality of frames exchanged between the first AP 202 and various other STAs associated therewith. For example, the second AP 204 can determine drift in timing or phases of known sequences across multiple messages. In some embodiments, the second AP 204 can employ joint estimation, such that the frequency offsets can be determined according to a function correlating therebetween.

Referring now to operation 403, the first STA 206 or the second STA 208 can determine a number or identity of the symbols 406, 408 (e.g., the LTF symbols) associated with an interference path. For example, first AP 202 or second AP 204 can include, in a respective data frame 304, 306 addressed to the first STA 206 the second STA 208, the indication of the number or the identity of the symbols 406, 408. The number or identity of the symbols 406, 408 may correlate to a number or identity of spatial streams of a signal path, such that a number or identity of the symbols 406, 408 can be an indication of the number or identity of spatial streams as received. For example, a transmitting device can provide a number of LTF symbols based on a number of spatial streams. Likewise, another indication of the number or identity of spatial streams can be indicative of the symbols.

In some embodiments, the indication can include an indication of the identity of the spatial stream. In various embodiments, the data frame can include any number or identity information in, for example, a preamble (e.g., SIG field). In some embodiments, the preamble or other indication can indicate a mapping between the spatial streams and LTF symbols. For example, the data frames 304, 306 can include an identifier of one or more LTF symbols (e.g., an explicit value for each symbol or an explicit value of a first symbol, wherein further symbols can be determined according to the first symbol).

The LTF symbols can correspond to a predefined sequence, wherein the LTF symbols are provided according to a predefined order. The LTF symbols can correspond to a predefined association with spatial channels. For example, each predefined channel (e.g., spatial stream) can correspond to a predefined symbol pair. A first symbol provided by an AP generating or receiving the trigger frame 302 (e.g., the first AP 202) or other communication over the AP signal path 210 can be predefined.

Any of the indications of number or identity of the spatial streams or LTF symbols can be provided with regard to a same signal path of transmission, or another signal path. For example, each data frame 304, 306 can include a number or identity of spatial streams of the signal path of the data frame and of an interfering data stream. For example, the data frame 304 provided to the second STA 208 from the second AP 204 can include an indication of the number or identity of spatial streams of the first downlink signal path 212 and the second downlink signal path 214. The second AP 204 can receive the number of spatial streams of the first downlink signal path 212 from the trigger frame 302 or another communication between the first AP 202 and second AP 204, over the AP signal path 210. In some instances, a number of symbols of a preamble (e.g., SIG field) can vary between the data frames 304, 306.

Wherein the first AP 202 receives an indication of the second downlink signal path 214, the first AP 202 can align any portion of the data frame 304, 306. For example, the first AP 202 can insert padding characters (e.g., padding bytes) during a transmission of additional LTF symbols, can repeat symbols, or can provide symbols intended to convey a non-use of a channel, or a potential use of a channel (e.g., such that the second STA 208 can characterize a second interference path 218 for a subsequent transmission). Further, padding characters or other information can be employed to at least temporally align an entirety of the data frames 304, 306. Although referring specifically to the first AP 202, like other instances and embodiments described herein, other combinations of STA and AP can employ the same operations (e.g., the second AP 204 can align a SIG field, frame, or so forth of a data frame 306 to align with another data frame 304).

Various other information related to the signal path can be included in the SIG field or otherwise encoded into the data frames 304, 306. For example, modulation-and-coding scheme (MCS) index information for any signal path can be included in either of the data frames 304, 306, such that the various STAs can adjust an RX chain, or post process a signal to discriminate between the interfering channel and an addressed signal path.

The trigger frame 302 and data frames 304, 306 can be sent within a single TXOP. For example, the first AP 202 can gain channel access to one or more channels associated with the first downlink signal path 212 or the second downlink signal path 214, such that the data frames may be sent without an additional allocation, assignment, scheduling, or clear to send (CTS)/ready to send (RTS) communication. Such TXOP packing can reduce network congestion and latency. The transmission of the trigger frame 302 and data frames 304, 306 may be separated by a predefined temporal duration (e.g., a short inter-frame spacing (SIFS) of, for example, 10 or 16 ρS). Hereinafter, with reference to FIG. 5, further messages are transmitted. Some such messages can intermediate the trigger frame from the data frames 304, 306 or otherwise be conveyed during the same TXOP. Such messages may also be spaced from the trigger frame 302 and data frames 304, 306, by a predefined temporal duration, such as the SIFS.

FIG. 5 is a sequence diagram 500 for communication between various devices of a network, such as a wireless network. Referring to operation 501, the second AP 204 can provide an acknowledgement (ACK) 502 to the first AP 202, responsive to the trigger frame 302. The ACK can include any of the information associated with the second AP 204, corresponding to any of the information associated with the first AP 202, described with regard to the trigger frame 302, or otherwise associated with the AP signal path 210. For example, the ACK 502 can include an indication of a number or identity of a spatial stream, an MCS index, or so forth. In some embodiments, the ACK 502 can include information pertaining to any planned DL transmission from an AP (e.g., the second AP 204) to a STA such as the second STA 208, including MCS, NSS, etc. to be used for the planned transmission. Thus, another device of the wireless network can determine frequency synchronization data or other transmission parameters associated with the second AP 204, and adjust an operation thereof, based thereupon. For example, the first AP 202 can adjust a transmission parameter based on the content of the ACK.

Referring to operation 503, the first AP 202 can establish or arbitrate a link with the first STA 206; the second AP 204 can establish or arbitrate a link with the second STA 208. For example, as depicted, a first message 504 of a multi-user RTS (MU-RTS) or other RTS can be conveyed between the first AP 202 and the first STA 206. A second message 506 (e.g., a MU-RTS) can be conveyed between the second AP 204 and the second STA 208. At operation 507, the first STA 206 or second STA 208 can provide a message responding to the RTS. For example, as depicted, the first STA 206 can provide a first CTS 508 and the second STA 208 can provide a second CTS 510 to indicate a status of the channel. The CTS or RTS portions can be aligned or orthogonal in frequency, time, or content, which may increase an intelligibility (e.g., decrease an interference) between the respective devices. Further, the CTS or RTS may be configured to provide an indication of an uplink path to the first AP 202 and second AP 204 or provide a further indication of a downlink path to the first STA 206 or second STA 208.

In various embodiments, the depicted MU-RTS-CTS can be substituted with various channel assessment messages. For example, the messages can be exchanged sequentially, or according to a multi-party handshake. In some embodiments, the channel can be assessed, arbitrated, or otherwise managed over the AP signal path 210 (e.g., a wired or wireless sideband connection).

Figure 6:
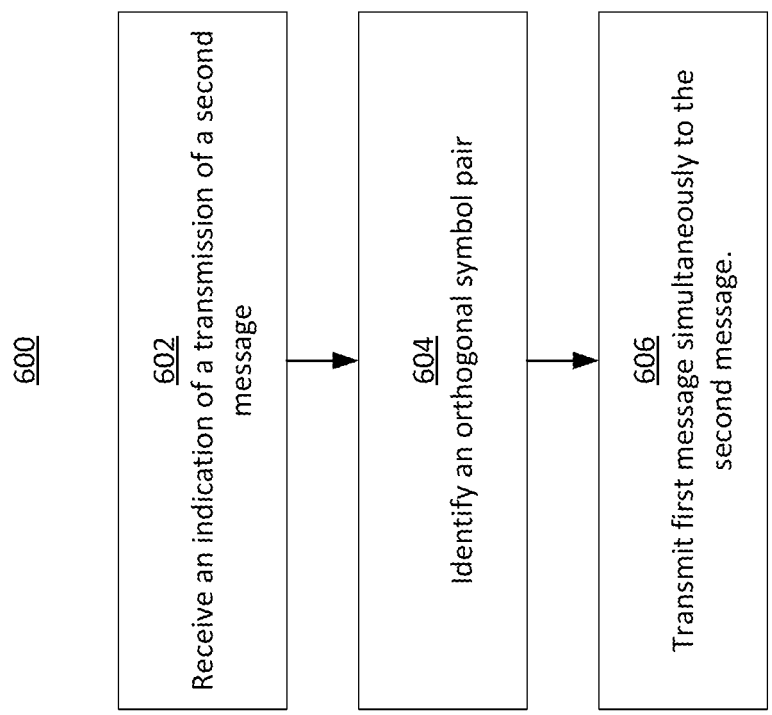
FIG. 6 is a flow diagram for a method of spatial reuse, according to some embodiments.

Referring now to FIG. 6, a method 600 for spatial reuse of a downlink is provided, according to some embodiments. At operation 602, a device receives an indication of a transmission of a message from another device. The device can be or include an AP configured to simultaneously transmit with another AP (e.g., the other device).

The indication of the transmission may include a trigger frame 302 or another indication, such as an indication received over a wired or wireless sideband link of the AP signal path 210. The indication of the transmission can include an indication of a transmission time (e.g., a scheduled transmission time) for the second message. For example, the indication can include an explicit indication of a time (e.g., UTC time, offset time relative to the indication, TXOP identity, or other indication of time). In some embodiments, the indication of the transmission time is based on a predefined offset. For example, the indication can be a wireless message (e.g., trigger frame 302) wherein the transmission time for the message is based on an offset therefrom (e.g., spaced by a SIFS). In some embodiments, the indication of the transmission can include an indication of one or more symbols (e.g., LTF symbols) which will be sent in the message. In some embodiments, the symbols to be transmitted in the message may otherwise be identified by the device (e.g., include pre-defined symbols provided according to a predefined sequence, such that the indication of the message itself it indicative of the symbol).

At operation 604, the device identifies a symbol (e.g., an LTF symbol) orthogonal to the symbol to be transmitted in the message. For example, the device can include a data structure such as a lookup table, including corresponding orthogonal signals which include one or more symbol which may be selected corresponding to the symbol to be sent in the message. In some embodiments, such as embodiments employing predefined symbols, the identification of the symbol may be incident to a role of the device or a standard of operation (e.g., a standard of the 802.11 family of standards). For example, the device can identify a symbol based on a role as the non-initiating AP for the spatial re-use, based on a connection type with an associated STA, or based on an indication of a standard of operation employed by the other device (e.g., based on the trigger frame 302 or another AP signal path 210 communication).

At operation 606, the device transmits a message, simultaneously with the message indicated by the other device. The respective messages can be data frames addressed to different STAs of a related, or other BSS. The simultaneous transmission may refer to a partial overlap or full overlap (e.g., alignment in duration) of a preamble (e.g., SIG field thereof), or of a data frame, or the like. The simultaneous transmission can provide interference channel information between the differently addressed STAs such that interference from subsequent messages simultaneously transmitted to at least one of the addressed STAs can be compensated for, by the STAs. Further, the devices may perform operations to align frequencies or temporal offsets which may further aid the operation of the STAs in receiving future messages.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beamformers and/or beamformees) that can operate within a system or environment. It should be understood that the systems described above can provide multiple ones of any or each of those components and these components can be provided on either a standalone machine or, in some embodiments, on multiple machines in a distributed system. Further still, bit field positions can be changed, and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical (e.g., magnetic), or optical.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

We claim:

1. A device, comprising:
a circuit configured to:
determine a first portion of a first received signal, the first received signal further comprising a second portion;
determine a first symbol indicated by the first portion of the first received signal, received from a first access point (AP) and addressed to the device;
determine a second symbol associated with the second portion of the first received signal, the second symbol being orthogonal to the first symbol and received from a second AP;
determine, using the second symbol, a characteristic of a signal path;
receive a second signal; and
determine a content of the second signal using the characteristic of the signal path.

2. The device of claim 1, wherein the first symbol and the second symbol are long training field (LTF) symbols, the first received signal comprises a first data frame comprising the first symbol, and a second data frame comprising the second symbol, the first data frame comprises a first plurality of additional LTF symbols, and the second data frame comprises a second plurality of additional LTF symbols, orthogonal to the first plurality of additional LTF symbols.

3. The device of claim 2, wherein:
the first symbol is time synchronized with the second symbol;
the first plurality of additional LTF symbols and the second plurality of additional LTF symbols include a same quantity of LTF symbols, which are time-synchronized; and
the first data frame and the second data frame employ a same guard interval for orthogonal frequency-division multiplexing modulation.

4. The device of claim 1, wherein
the second portion of the first received signal is received from the second AP, and is not addressed to the device.

5. The device of claim 4, wherein the device receives the first received signal prior to an expiration of a TXOP of a message exchanged between the first AP and the second AP, the message identifying one or more of the first symbol or the second symbol.

6. The device of claim 1, wherein:
the first symbol is one of a plurality of first symbols;
the second symbol is one of a plurality of second symbols; and
a quantity of the plurality of first symbols is equal to a quantity of the plurality of second symbols.

7. A system, comprising:
a first access point (AP) configured to:
identify a first plurality of symbols configured to characterize an interaction between a first signal path comprising the first AP and a second signal path comprising a second AP, the first plurality of symbols orthogonal to a second plurality of symbols, responsive to a receipt of an indication, from the second AP, of a transmission of a second message comprising the second plurality of symbols; and
transmit a first message comprising the first plurality of symbols, temporally and spectrally overlapping the the transmission of the second message.

8. The system of claim 7, comprising the first AP to:
provide, to the second AP, an indication of a transmission of a third message prior to the transmission of the third message, wherein:

the third message comprises the second plurality of symbols; and the indication of the transmission of the third message comprises a transmission time for the third message.

9. The system of claim 7, wherein the first AP is configured to:

determine, using the indication of the transmission of the second message, frequency synchronization data, wherein the first message is transmitted using the frequency synchronization data.

10. The system of claim 7, wherein the indication of the transmission of the second message is transmitted on a same TXOP as the first message and the second message.

11. The system of claim 7, wherein the first AP is configured to:

transmit a fourth message to the second AP, responsive to the receipt of the indication of the transmission of the second message and prior to the transmission of the first message, the fourth message comprising transmission parameters of the first message.

12. The system of claim 7, wherein the first AP and the second AP are connected over an interface, separate from a signal path of:

the first message;

the second message; and the indication of the transmission of the second message.

13. The system of claim 7, wherein:

the first message comprises a first preamble including an indication of a spatial stream of the first message; and the second message comprises a second preamble including an indication of a spatial stream of the second message.

14. The system of claim 13, wherein:

the first preamble and the second preamble are aligned in temporal duration; and the indication of the spatial stream of the second message comprises a quantity of spatial streams of the second message.

15. The system of claim 13, wherein;

the first preamble and the second preamble are orthogonal to each other; and the indication of the spatial stream of the second message comprises an identity of each spatial stream of the second message.

16. The system of claim 13, wherein the second plurality of symbols are a plurality of predefined long training field (LTF) symbols, predefined according to a correspondence to the first plurality of symbols.

17. A method, comprising:

receiving, by a first access point (AP), an indication, from a second AP, of a transmission of a second message, the second message comprising a second symbol, and the indication comprising a transmission time of the second message;

identifying, by the first AP, a first symbol orthogonal to the second symbol and configured to characterize an interaction between a first signal path comprising the first AP and a second signal path comprising the second AP; and transmitting a first message comprising the first symbol, temporally and spectrally overlapping the transmission of the second symbol of the second message.

18. The method of claim 17, comprising:

identifying, from the indication, first frequency synchronization data corresponding to the second AP.

19. The method of claim 18, comprising:

sending a third message to indicate second frequency synchronization data corresponding to the first AP, to the second AP.

20. The method of claim 17, comprising:

sending the second message within a same TXOP in which the indication is received.

* * * * *